Patented Apr. 11, 1950

2,503,781

UNITED STATES PATENT OFFICE 2,503,781

ORGANIC IRON-ALKALI METAL COMPLEXES

Clarence T. Van Meter, Arlington, and Joseph A. Bianculli, Jersey City, N. J., assignors to Reed & Carnrick, Jersey City, N. J., a corporation of New Jersey No Drawing. Application April 9, 1946, Serial No. 660,856

15 Claims. (Cl. 260—439)

This invention relates to substantially neutral organic iron-alkali metal complexes, especially suitable for hemoglobin regeneration in instances where the need for iron is indicated, and to their preparation.

A good hematinic when administered orally should be readily assimilable from the gastro-intestinal tract and should not cause gastro-intestinal reactions commonly looked upon as manifestations of toxicity. Many of the most popular iron compounds used as hematinics suffer in one or the other or both of these regards. Reduced iron, ferrous carbonate and ferrous phosphate for example, depend upon the acidity of the gastric juice for their very solubilization; thus in patients suffering from gastric hypoacidity, such compounds never experience conditions conducive to maximum solubilization and as a result the opportunity for assimilation is accordingly minimized.

Other popular iron salts such as ferrous sulfate, ferrous lactate and ferrous gluconate, although sufficiently soluble in gastric juice of wide range in pH, are objectionable because of the fact that due either to acidic groups within the molecule or to products of hydrolysis, solutions of these salts are acid in reaction. By altering the normal pH of the fluid in which they are dissolved, these salts may thus cause the gastro-intestinal disturbances which are frequently observed following their administration.

Still other common iron salts such as iron and ammonium citrate and iron and sodium citrate and the corresponding tartrates, although readily dissolved to form solutions which are practically neutral, are open to the important objection that they contain all of their iron in the ferric state and hence are decidedly less efficient as hemoglobin regenerators than compounds containing at least part of their iron in the ferrous state.

It is an object of this invention to produce an organic iron-alkali metal complex which is substantially neutral.

Another object of this invention is to provide organic iron compounds which are soluble in liquids encountered in those regions of the gastro-intestinal tract from which absorption can take place, and especially one the solubilization of which is independent of the pH of the gastric juice.

A further object of this invention is to provide a hematinic of low toxicity as reflected by absence of gastro-intestinal disturbances such as nausea, flatulence, regurgitation, epigastric distress, diarrhea, constipation, etc.

A further object of this invention is to produce an organic iron-alkali metal complex in which a variable but controllable part of the total iron is present in either the ferrous or the ferric state.

An additional object of this invention is to provide an organic iron complex wherein an exceptionally high percentage of the iron content is assimilated by the human body to effect hemoglobin regeneration.

Other objects, purposes, and advantages of our invention will be obvious from the more detailed description which follows.

We have found that aqueous solutions of iron malate, freshly prepared by allowing ferrous carbonate or hydroxide to react with a chemically equivalent quantity of malic acid, are decidedly acidic, and can be made to react with significant quantities of an alkali without causing permanent participation of iron hydroxide. We have found further that the suitability of iron malate as a hematinic is greatly enhanced by converting it into a neutral or substantially neutral iron complex which results by reacting it with an alkali, more particularly by reacting it with sodium, potassium, or ammonium hydroxides, carbonates or bicarbonates.

Due to the commercial unavailability of highly purified ferrous compounds of the type needed here, and in order to achieve the objectives of our invention, we have found it necessary to prepare fresh ferrous carbonate or hydroxide from which our iron malate is produced. The ferrous carbonate or hydroxide is formed by mixing aqueous solutions of ferrous salts such as ferrous sulfate, nitrate, or chloride with solutions of alkali carbonates, bicarbonates, or hydroxides, respectively. The resulting ferrous carbonate or hydroxide precipitates out and all contaminating by-products of the reaction are held in solution. The precipitate is thoroughly washed with water to remove the contaminating by-products and thus to provide a highly purified ferrous compound to be reacted in the next step of our process.

The purified ferrous carbonate or hydroxide obtained in the first step of our process is then reacted with an equimolar quantity of malic acid to form an iron malate sometimes referred to herein as ferrous malate. An excess of the ferrous carbonate or ferrous hydroxide may be used but such excess must be separated, as by filtration, before proceeding to the next step in the process. The reaction is customarily effected by adding an aqueous solution of the malic acid to an aqueous suspension of the ferrous carbonate or hydroxide, using heat if desired to accelerate the reaction. The resulting iron malate solution is decidedly acidic. The acidic iron malate contained therein is converted into a substantially neutral iron-alkali metal complex salt by gradually introducing an alkali such as sodium, potassium, or ammonium hydroxide, carbonate, or bicarbonate until the pH of the solution is between 6 and 7. Upon the addition of the alkali, and especially when the solution is approaching the point of neutralization, local precipitation of ferrous hydroxide or carbonate is observed, but stirring will quickly cause this precipitate to redissolve as long as the total solution remains acidic. Failure of this local precipitation to clear up when the reaction mixture is agitated may be used as a guide to the amount of alkali required instead of following the course of the reaction through changes in the pH.

After the iron malate solution is rendered neutral, the reaction mixture is filtered and then evaporated to dryness whereby a purified neutral iron-alkali metal complex salt is obtained. In a typical situation, an organic iron-sodium complex, iron sodium malate is obtained which on analysis shows itself to contain approximately 2 per cent of sodium, 27 per cent of iron, and 72 per cent of malic acid.

One of the very important advantages of our invention resides in the fact that we can control the proportion of ferrous and ferric iron in the final iron complex by regulating the evaporating conditions. Under non-oxidative or mildly oxidative conditions such as experienced by evaporating in an inert atmosphere, or under conditions of materially reduced pressure, or under conditions of the various commercial spray or drum drying techniques adjusted for very rapid evaporation, all or substantially all, of the iron can be maintained in the ferrous state. Under conditions which do not inhibit oxidation, however, such as slow evaporation with exposure to air, the iron tends to pass into the ferric state. By varying evaporation conditions between that extreme set conducive to all ferrous iron in the final product and the other extreme set conducive to all ferric iron in the final product, iron sodium malates containing different percentages of ferrous and ferric iron may be produced as desired.

When a medicinal agent intended for oral administration is desired, we commonly evaporate the neutralized iron malate solution under such conditions that at least 25 per cent of the total iron in the dried product is in the ferrous state, although in certain instances it is desirable to make the conditions such that 75 per cent or more of the total iron is in the ferrous state. For example, by exposing the solution to a source of heat of about 100° C. and permitting the evaporation to take place in a chamber wherein the air pressure has been reduced to from $1/20$ to $1/40$ of an atmosphere, an iron sodium malate can be obtained having at least 90 per cent of its total iron in the ferrous state.

When a medicinal agent intended for parenteral administration is desired, it is sometimes advantageous to allow more oxidation to take place, since this provides a substance of somewhat improved physical properties for this type of administration. For example, by evaporating the neutralized iron malate solution slowly in fairly shallow containers exposed to air, an iron sodium malate can be obtained having at least 25 per cent of its total iron in the ferric state. At times it is advantageous to so adjust the evaporation rate that up to 75 per cent or more of the total iron is in the ferric condition.

It will be understood that although the malic acid which we customarily use in our reactions is the racemic malic acid, either the d- or the l-malic acid may be used if desired. It will also be understood that the term iron is used in this specification in its generic sense and includes both ferrous and ferric iron. It will be understood further that the term alkali as used herein includes in addition to the hydroxides, carbonates, and bicarbonates of the existible alkali metals, the corresponding compounds of the hypothetical alkali metal, ammonium.

The principles and practices of our invention will be readily understood from the following detailed description of the production of a typical iron sodium malate.

*Example*

Two thousand nine hundred and forty-four grams of ferrous sulfate (heptahydrate) was dissolved in acidulated water, and the solution so obtained was added with constant stirring to a hot solution containing sodium carbonate in an amount slightly in excess of the equimolar quantity theoretically needed for complete reaction. Ferrous carbonate formed readily and precipitated out as a grayish-green mass. This precipitate was allowed to settle and the clear supernatant liquid containing surplus sodium carbonate and by-product sodium sulfate was siphoned off. More water was then added, the mixture agitated thoroughly, and the ferrous carbonate again allowed to settle after which the supernatant liquid was again removed. This washing process was repeated until only traces of the carbonate, the sulfate or both remained.

The suspension of purified ferrous carbonate obtained in the preceding step was treated with an approximately equimolar portion of malic acid dissolved in a convenient quantity of water. The reaction mixture was heated mildly to facilitate reaction. The iron malate solution so formed was green in color and decidedly acidic in reaction.

Sufficient sodium hydroxide solution was gradually added to the acidic iron malate solution to render the solution substantially neutral, that is, until it had a pH of between 6 and 7. Upon evaporation of the excess water, substantially neutral iron sodium malate was obtained.

Depending upon the procedure used in the evaporation, the iron sodium malate obtained varied from green to reddish brown. The green iron sodium malate contained principally ferrous iron while the reddish-brown iron sodium malate contained principally ferric iron. By following the procedures previously described, the percentages of ferrous and ferric iron could be regulated within desired proportions.

Instead of reacting the iron carbonate with an aqueous solution of malic acid, we have found that our iron sodium malate can also be prepared in good yield by adding solid malic acid to the suspension of ferrous carbonate. Sodium carbonate or bicarbonate may also be used to neutralize the iron malate solution instead of sodium hydroxide.

By following the procedures disclosed above and substituting potassium or ammonium hydroxide, carbonate, or bicarbonate for the sodium hydroxide, carbonate, or bicarbonate, we have prepared iron potassium malate and iron ammonium malate. These practically neutral organic iron-metal complexes have substantially the same properties as the iron sodium malate.

The iron sodium malate and the related compounds of this invention are very much more soluble than ferrous malate, form aqueous solutions which are practically neutral, and are soluble in both neutral and acidic gastro-intestinal fluids. These properties make our new compounds especially valuable hematinics.

The ease with which our novel organic iron complexes are assimilated is illustrated by clinical tests with an iron sodium malate containing about 26 per cent of total iron, about one-third of which was ferrous iron. In a series of tests, a group of patients suffering from iron deficiency anemia were treated daily, through oral administration, with 800 mg. of the aforesaid iron sodium malate. After thirty days an average hemoglobin regeneration of 15 per cent had been effected. On the basis of the results achieved, it can be calculated that about 7 per cent of the total iron was thus transformed into hemoglobin. This utilization is about two times the utilization reported in the literature for ferric ammonium citrate, the most popular organic iron hematinic.

The physiological utilization of the iron sodium malate can be further increased by compounding it with known hematopoietic catalysts. In one such clinical experiment, for example, the utilization of our iron sodium malate was increased to over 10 per cent.

In another clinical evaluation of the advantages of the iron sodium malates of this invention, it was found that the frequency of gastrointestinal disturbances associated with the administration of the iron sodium malate was only about one fifth as great as that experienced with ferrous sulfate which is the most widely used of the current hematinics.

It will be understood that the present invention is not limited to illustrative examples but extends to all equivalents, within the scope of the appended claims, which will occur to those skilled in the art upon considering the invention disclosed herein.

It is to be understood that in the claims alkali metal is used in its generic sense and includes ammonia.

We claim:

1. A process for producing a substantially neutral organic iron-alkali metal complex salt comprising reacting a water soluble ferrous salt with an alkali metal alkali to form an insoluble ferrous precipitate and a soluble alkali salt, reacting said precipitate with malic acid in substantially molar proportions to form iron malate solution, and neutralizing the acidic iron malate with an alkali metal alkali.

2. A process for producing a substantially neutral organic iron-alkali metal complex comprising gradually introducing into an aqueous solution of ferrous malate an alkali metal alkali until the reaction mixture has a pH between 6 and 7.

3. A process for producing a substantially neutral dry organic iron-alkali metal complex containing predominantly ferrous iron comprising gradually introducing an alkali metal alkali into an aqueous solution of ferrous malate until the pH of the solution is between 6 and 7, and drying the formed, substantially neutral iron-alkali metal malate under mildly oxidative to non-oxidative conditions to produce a ferriferous alkali metal malate containing principally ferrous iron.

4. A process for producing a substantially neutral dry organic iron-alkali metal complex containing predominantly ferric iron comprising gradually introducing an alkali metal alkali into an aqueous solution of ferrous malate until the pH of the solution is between 6 and 7, and drying the formed, substantially neutral iron-alkali metal malate under oxidative conditions converting a preponderance of the ferrous iron into ferric iron to produce a ferriferous alkali metal malate containing principally ferric iron.

5. The product of the process of claim 2.

6. The product of the process of claim 3.

7. The product of the process of claim 4.

8. A process for producing an organic iron-alkali metal complex comprising introducing into an aqueous solution of a ferrous malate an alkali metal alkali until the acidity of the ferrous malate solution is reduced but the pH of the solution does not exceed 7 and until a substantial amount of alkali metal is introduced into the ferrous malate to form an iron-alkali metal malate complex, and drying the formed iron-alkali metal malate under oxidative to nonoxidative conditions to form a solid product having the iron content thereof in desired proportions of ferric and ferrous iron.

9. The product of the process of claim 8.

10. A process for producing an organic iron-alkali metal complex comprising introducing into an aqueous solution of a ferrous malate a sodium alkali until the acidity of the ferrous malate solution is reduced but the pH of the solution does not exceed 7 and until a substantial amount of sodium is introduced into the ferrous malate to form an iron-sodium malate complex, and drying the formed iron-sodium malate under oxidative to nonoxidative conditions to form a solid product having the iron content thereof in desired proportions of ferric and ferrous iron.

11. The product of the process of claim 10.

12. A process for producing an organic iron-alkali metal complex comprising introducing into an aqueous solution of a ferrous malate an ammonium alkali until the acidity of the ferrous malate solution is reduced but the pH of the solution does not exceed 7 and until a substantial amount of ammonium is introduced into the ferrous malate to form an iron-ammonium malate complex, and drying the formed iron-ammonium malate under oxidative to nonoxidative conditions to form a solid product having the iron content thereof in desired proportions of ferric and ferrous iron.

13. The product of the process of claim 12.

14. A process for producing an organic iron-alkali metal complex comprising introducing into an aqueous solution of a ferrous malate a potassium alkali until the acidity of the ferrous malate solution is reduced but the pH of the solution does not exceed 7 and until a substantial amount of potassium is introduced into the ferrous malate to form an iron-potassium malate complex, and drying the formed iron-potassium malate under oxidative to nonoxidative conditions to form a solid product having the iron content thereof in desired proportions of ferric and ferrous iron.

15. The product of the process of claim 14.

CLARENCE T. VAN METER.
JOSEPH A. BIANCULLI.

(References on following page)

REFERENCES CITED

The following references are of record in the file of this patent:

UNITED STATES PATENTS

| Number | Name | Date |
|---|---|---|
| 1,964,696 | Traube et al. | June 26, 1934 |
| 2,081,547 | Mattheus | May 25, 1937 |
| 2,087,999 | Salzberg | July 27, 1937 |
| 2,281,735 | Wieder | May 5, 1942 |

FOREIGN PATENTS

| Number | Country | Date |
|---|---|---|
| 335,475 | Germany | Apr. 2, 1921 |
| 636,308 | Germany | Oct. 15, 1936 |

OTHER REFERENCES

Jour. Chem. Soc. (London) 103T (1913) p. 1366, Pickering (complete article p. 1358–68).

Archiv. der Pharmazie, vol. 246 (1908), p. 51–57, Resonthaler et al.

Certificate of Correction

Patent No. 2,503,781 April 11, 1950

CLARENCE T. VAN METER ET AL.

It is hereby certified that error appears in the printed specification of the above numbered patent requiring correction as follows:

Column 2, line 20, for "participation" read *precipitation*; and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*